United States Patent
Kodani et al.

(10) Patent No.: US 7,968,649 B2
(45) Date of Patent: Jun. 28, 2011

(54) PROCESS FOR PREPARING VINYLIDENE FLUORIDE HOMOPOLYMER HAVING I-FORM CRYSTAL STRUCTURE

(75) Inventors: Tetsuhiro Kodani, Settsu (JP); Yuji Imahori, Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 12/754,265

(22) Filed: Apr. 5, 2010

(65) Prior Publication Data

US 2010/0249324 A1  Sep. 30, 2010

Related U.S. Application Data

(63) Continuation of application No. 11/659,361, filed as application No. PCT/JP2005/012756 on Jul. 11, 2005, now Pat. No. 7,718,229.

(30) Foreign Application Priority Data

Aug. 6, 2004 (JP) ................. 2004-231251

(51) Int. Cl.
- *B05D 3/00* (2006.01)
- *B05D 3/02* (2006.01)
- *C08L 23/00* (2006.01)
- *C08L 27/12* (2006.01)

(52) U.S. Cl. ...... 525/199; 525/240; 427/352; 427/372.2

(58) Field of Classification Search .................. 525/199, 525/240; 427/352, 372.2

See application file for complete search history.

(56) References Cited

U.S. PATENT DOCUMENTS

| | | | |
|---|---|---|---|
| 3,931,446 A | 1/1976 | Murayama et al. | |
| 4,615,848 A | 10/1986 | Krueger et al. | |
| 4,615,943 A | 10/1986 | Sakagami et al. | |
| 7,449,111 B2 * | 11/2008 | Hedhli et al. | 210/500.35 |
| 2005/0212180 A1 | 9/2005 | Subramaniam et al. | |

FOREIGN PATENT DOCUMENTS

| | | |
|---|---|---|
| EP | 1 607 986 | 12/2005 |
| EP | 1 743 710 A | 1/2007 |
| JP | 63-309551 A | 12/1988 |
| JP | 4-311711 A | 11/1992 |
| JP | 11-333924 A | 12/1999 |
| JP | 2004-076108 A | 3/2004 |
| JP | 2005-179524 A | 7/2005 |
| JP | 2005-200623 A | 7/2005 |
| WO | 2004/086419 | 10/2004 |

OTHER PUBLICATIONS

Herman et al: "Chain Length Effects on Crystal Formation in Vinylidene Fluoride Oligomers" Polymer Journal, Society of Polymer Science, Tokyo, Japan, vol. 30, No. 9, Aug. 1, 1999, pp. 659-663, XP009116017.

* cited by examiner

*Primary Examiner* — Nathan M Nutter
(74) *Attorney, Agent, or Firm* — Sughrue Mion, PLLC

(57) ABSTRACT

The present invention provides a process for easily preparing a vinylidene fluoride homopolymer comprising an I-form crystal structure at high purity by selecting a solvent, and the process for preparing the vinylidene fluoride homopolymer comprises not less than 70% by mass of I-form crystal structure, which is obtained by dissolving a vinylidene fluoride homopolymer having a number average degree of polymerization of 3 to 20 in a solvent consisting of an organic solvent having a dipole moment of not less than 2.8 alone or comprising the organic solvent in a part, thereafter, evaporating the solvent.

11 Claims, 5 Drawing Sheets

PROCESS FOR PREPARING VINYLIDENE FLUORIDE HOMOPOLYMER HAVING I-FORM CRYSTAL STRUCTURE

CROSS-REFERENCE TO RELATED APPLICATIONS

This application is a Continuation of U.S. patent application Ser. No. 11/659,361 filed Feb. 5, 2007, and now U.S. Pat. No. 7,718,229 which is a 371 of PCT Application No. PCT/JP2005/012756 filed Jul. 11, 2005 and which claims benefit of Japanese Application No. 2004-231251 filed Aug. 6, 2004. The above-noted applications are incorporated herein by reference in their entirety.

TECHNICAL FIELD

The present invention relates to a process for preparing a vinylidene fluoride homopolymer comprising I-form crystal structures at high purity, and a method of forming a thin film comprising the vinylidene fluoride homopolymer comprising I-form crystal structures at high purity.

BACKGROUND ART

Polymer type ferroelectric materials have advantages such as flexibility, light-weight, good processability and low price as compared with inorganic ferroelectric materials such as ceramics. There are known, as represented examples thereof, vinylidene fluoride polymers such as polyvinylidene fluoride (PVdF) and vinylidene fluoride/trifluoroethylene (VdF/TrFE) copolymer.

With respect to PVdF, crystal structures thereof are roughly classified into three kinds such as I-form (also said to be β-form), II-form (α-form) and III-form (γ-form). Among them, it is only I-form crystal that can sufficiently exhibit high ferroelectricity.

High molecular weight PVdF is prepared by a radical polymerization method forms II-form crystal structure and does not exhibit ferroelectricity as is. In order to convert II-form crystal structure of PVdF to I-form crystal structure, there are required complicated post-steps such as stretching and heat-treating of a film or rapid cooling under high pressure at casting.

Matsushige et al have studied formation of a thin film of vinylidene fluoride oligomer having I-form crystal structure by using vinylidene fluoride oligomer: $CF_3(CH_2CF_2)_nI$ (number average degree of polymerization n=17) having II-form crystal structure (M & BE Vol. 11, No. 2, 145 (2000)).

However, Matsushige et al. have only studied vinylidene fluoride oligomers having an iodine atom at its end.

Okui et al. analyzed the crystal structure of vinylidene fluoride oligomer: $CCl_3(CH_2CF_2)_nCl$ (number average degree of polymerization n=9) prepared by radical polymerization by using $CCl_4$ as a chain transfer agent (telogen) and dinormalperoxy dicarbonate as a catalyst, and have reported that this oligomer was a mixture of crystal structures of I-form (β-form) and III-form (γ-form) and had a crystalline melting point Tm at two points (74° C. and 110° C.) (Polymer Journal, Vol. 30, No. 8, pp. 659 to 663 (1998), and POLYMER Vol. 38, No. 7, pp. 1677 to 1683 (1997)). However, Okui et al. have only studied vinylidene fluoride oligomers having an iodine atom at its end.

Other than these, there is a method of introducing a hydroxyl group into an end by a polymerization method using methanol as a chain transfer agent (telogen) (Macromol. Chem. Phys., 199, pp. 1271 to 1289 (1998)), however, only the polymerization method is studied, and a process for efficiently preparing a homopolymer having crystal structures of I-form (β-form) being capable of exhibiting ferroelectric characteristics at excellent purity is not indicated. Formation of a thin film certainly has not been studied at all.

In Macromolecules, 35, pp. 2682 to 2688 (2002), high molecular weight PVdF having a weight average molecular weight of 534,000 is dissolved in an organic solvent mixture of dimethylformaminde (DMF) with various solvents such as dimethyl sulfoxide (DMSO), acetonitrile, dimethylacetamide (DMA) and acetone, and influences of a dipole moment of an organic solvent and water content in formation of crystal structures of I-form (β-form) have been studied. However, crystal structures of only III-form (γ-form) or II-form (α-form) are obtained by precipitation from the organic solvent, and a PVdF film having crystal structures of I-form (β-form) at high purity has not been obtained (see Table 1 in Macromolecules, 35, pp. 2682 to 2688 (2002)).

JP-A-63-145353 discloses that a thin film mixture with improved adhesion to a substrate is obtained by forming a film by dissolving a ferroelectric fluorine-containing polymer such as polyvinylidene fluoride and a non-ferroelectric polymer into N-methyl-2-pyrrolidone with heating. However, spontaneous polarization of the ferroelectric thin film obtained in JP-A-63-145353 is as low as about 80 to 500 $nC/cm^2$, thus, the thin film cannot be ever expected to be put into practical use.

DISCLOSURE OF INVENTION

The first object of the present invention is to provide a process for easily preparing a vinylidene fluoride homopolymer having I-form crystal structures of high purity by selecting a solvent.

The second object of the present invention is to provide a method of forming a thin film of the vinylidene fluoride homopolymer having I-form crystal structures, which has various functions.

The present inventors have made intensive studies, and as a result, reached the completion of the present invention by finding that a purity of the I-form crystal structures is dramatically improved by a simple treatment of dissolving the vinylidene fluoride homopolymer in a solvent comprising a specific organic solvent alone or comprising the organic solvent as a part thereof, and evaporating the organic solvent.

Namely, the present invention relates to a process for preparing a vinylidene fluoride homopolymer comprising not less than 70% by mass of I-form crystal structures, in which the process comprises dissolving a vinylidene fluoride homopolymer having a number average degree of polymerization of 3 to 20 (hereinafter referred to as "specific vinylidene fluoride homopolymer") in a solvent comprising an organic solvent having a dipole moment of not less than 2.8 alone or comprising the organic solvent as a part thereof, and thereafter, evaporating the solvent.

The present invention also relates to a method of forming a thin film comprising a vinylidene fluoride homopolymer comprising not less than 70% by mass of I-form crystal structures, in which the method comprises dissolving a vinylidene fluoride homopolymer having a number average degree of polymerization of 3 to 20 in a solvent comprising an organic solvent having a dipole moment of not less than 2.8 alone or comprising the organic solvent as a part thereof, and thereafter, applying the solution of vinylidene fluoride homopolymer to a substrate, and evaporating the solvent.

It is particularly effective in applications when the vinylidene fluoride homopolymer has a number average degree of polymerization of the vinylidene fluoride homopolymer unit of 3 to 20, and contains, at one end or both ends thereof, a moiety represented by the formula (I):

$$-(R^1)_n-Y \qquad (1)$$

wherein $R^1$ is a bivalent organic group, and does not contain a structural unit of the vinylidene fluoride homopolymer; n is 0 or 1; Y is a hydrogen atom, a halogen atom, or an alkyl group which may contain a halogen atom, however when n is 0, Y is not an iodine atom.

Even if other polymers soluble in the organic solvent are dissolved together, the obtained thin film shows ferroelectricity.

BEST MODE FOR CARRYING OUT THE INVENTION

Figure 1:
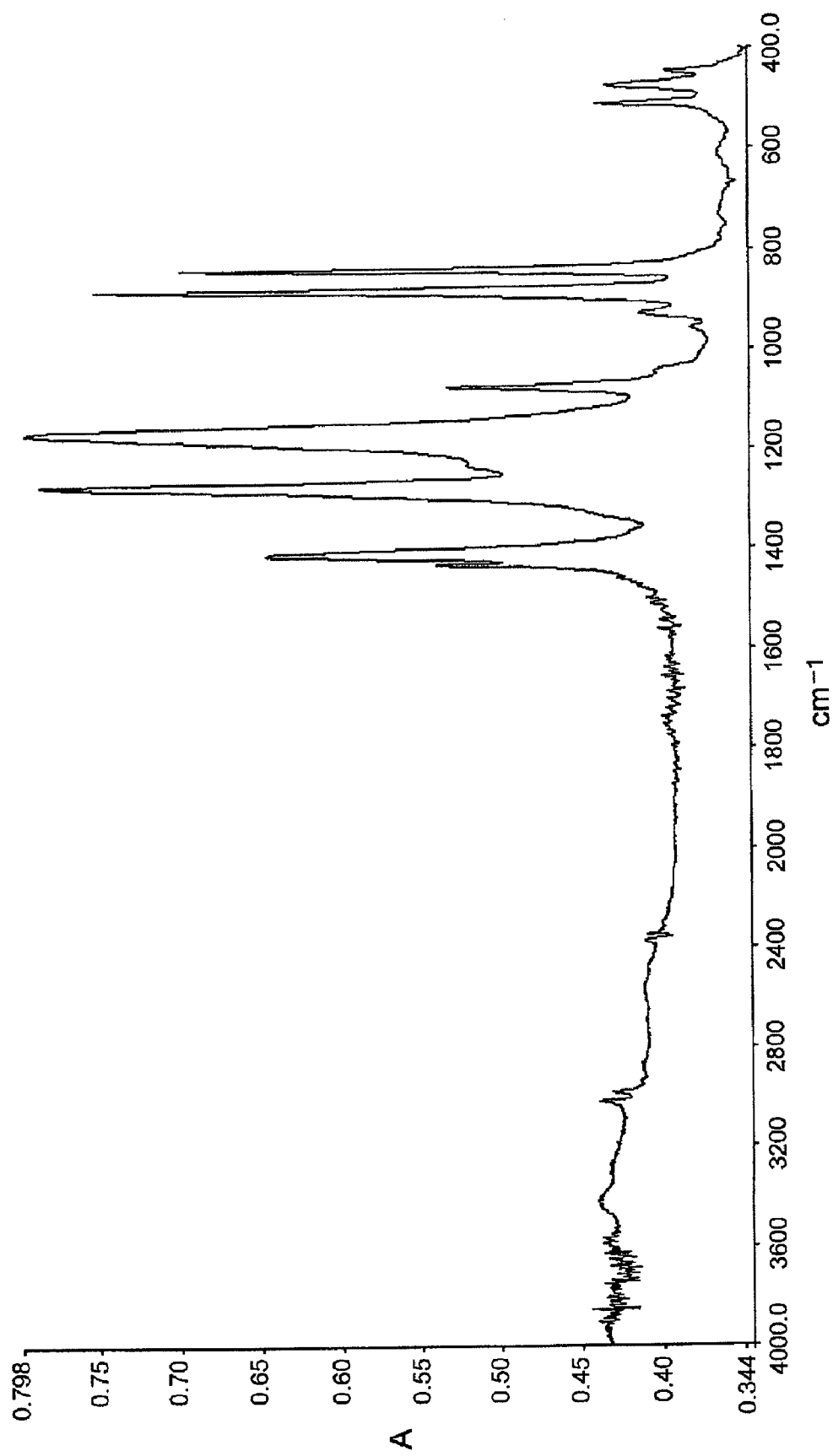
FIG. 1 is an IR chart of vinylidene fluoride homopolymer of all-I-form crystal structure.

Now, the present invention is explained concretely.

The I-form crystal structure of vinylidene fluoride homopolymer is characterized in that a fluorine atom bonded to one carbon atom of the trunk chain in the polymer molecule and a hydrogen atom bonded to the neighboring carbon atom take a trans form conformation (TT conformation). Namely, the fluorine atom and hydrogen atom bonded to the neighboring carbon atoms are positioned oppositely at an angle of 180° when viewed from the carbon-carbon bond.

In the present invention, the vinylidene fluoride homopolymer having I-form crystal structure may take the TT conformation in the whole of one polymer molecule or in a part of the polymer molecule, and has the molecular chain of the TT conformation in at least four continuous vinylidene fluoride monomer units. In any case, the carbon-carbon bond, in which the TT conformation constitutes the TT trunk chain, has a planar zigzag structure, and the dipole moments of C—$F_2$ and C—$H_2$ bonds have moieties in the vertical direction to the molecular chain. When the vinylidene fluoride homopolymer having I-form crystal structure is subjected to IR analysis, there are characteristic peaks (characteristic absorptions) around 1,274 cm$^{-1}$, 1,163 cm$^{-1}$ and 840 cm$^{-1}$. In powder X-ray diffraction analysis, there is a characteristic peak around 2θ=21°.

In the IR analysis, when characteristic absorptions of I-form crystal structure are recognized but characteristic absorptions of II-form and III-form crystal structures are not recognized substantially, the crystal structure is called "all-I-form crystal structure".

The II-form crystal structure of vinylidene fluoride homopolymer is characterized in that when a fluorine atom (or hydrogen atom) is bonded to one carbon atom of the trunk chain in the polymer molecule, a hydrogen atom (or fluorine atom) bonded to one neighboring carbon atom takes a trans form, and a hydrogen atom (or fluorine atom) bonded to another (opposite) neighboring carbon atom takes a gauche form (positioned at an angle of 60°), and there are two or more continuous chains of this conformation (TGTḠ conformation).

The molecular chain is of

TGTḠ type and the dipole moments of C—$F_2$ and C—$H_2$ bonds have respective moieties in both the vertical and horizontal directions to the molecular chain. When the vinylidene fluoride homopolymer having II-form crystal structure is subjected to IR analysis, there are characteristic peaks (characteristic absorptions) around 1,212 cm$^{-1}$, 1,183 cm$^{-1}$ and 762 cm$^{-1}$. In powder X-ray diffraction analysis, there are characteristic peaks around 2θ=17.7°, 18.3° and 19.9°.

In the IR analysis, when characteristic absorptions of II-form crystal structure are recognized but characteristic absorptions of I-form and III-form crystal structures are not recognized substantially, the crystal structure is called "all-II-form crystal structure".

The III-form crystal structure of vinylidene fluoride homopolymer is characterized by having a conformation

TGTḠ comprising TT conformation and TG conformation alternating continuously. The molecular chain is of

T3GT3Ḡ type and the dipole moments of C—$F_2$ and C—$H_2$ bonds have respective moieties in both vertical and horizontal directions to the molecular chain. When the vinylidene fluoride homopolymer having III-form crystal structure is subjected to IR analysis, there are characteristic peaks (characteristic absorptions) around 1,235 cm$^{-1}$ and 811 cm$^{-1}$. In powder X-ray diffraction analysis, there is a characteristic peak around 2θ=18°.

Usually the presence of III-form crystal structure is recognized in the form of a mixture with the I-form crystal structure and/or the II-form crystal structure.

The presence and proportions of vinylidene fluoride homopolymers having I-form, II-form or III-form crystal structure can be analyzed by various methods such as X-ray diffraction method and IR analysis method. In the present invention, the content F(I) of I-form crystal structures in the vinylidene fluoride homopolymer is calculated from a peak height (absorbance A) of characteristic absorption of each crystal structure in an IR analysis chart by the following methods.

(1) Calculation of content (% by mass, F(I)×100) of I-form in a mixture of I-form and II-form (1-1) Equation $$A = \epsilon bC \qquad \text{Law of Beer:}$$

(In the equation, A represents an absorbance, ε represents a molar extinction coefficient, b represents an optical path length, and C represents a concentration.) From the equation, when an absorbance of characteristic absorption of I-form crystal structure is assumed to be $A^I$, an absorbance of characteristic absorption of II-form crystal structure is assumed to be $A^{II}$, a molar extinction coefficient of I-form crystal is assumed to be $\epsilon^I$, a molar extinction coefficient of II-form crystal is assumed to be $\epsilon^{II}$, a concentration of I-form crystal is assumed to be $C^I$ and a concentration of II-form crystal is assumed to be $C^{II}$, the following equation is obtained.

$$A^I/A^{II} = (\epsilon^I/\epsilon^{II}) \times (C^I/C^{II}) \tag{1-a}$$

When a correction factor $(\epsilon^I/\epsilon^{II})$ of the molar extinction coefficient is assumed to be $E^{I/II}$, the content $F(I)$ $(=C^I/(C^I+C^{II}))$ of I-form crystal structure is represented by the following equation.

$$F(I) = \frac{\frac{1}{E^{I/II}} \times \frac{A^{II}}{A^I}}{1 + \frac{1}{E^{I/II}} \times \frac{A^{II}}{A^I}} \tag{2-a}$$
$$= \frac{A^I}{E^{I/II} A^{II} + A^I}$$

Therefore when the correction factor $E^{I/II}$ is decided, the content $F(I)$ of I-form crystal structure can be calculated from a measured absorbance $A^I$ of characteristic absorption of I-form crystal structure and a measured absorbance $A^{II}$ of characteristic absorption of II-form crystal structure.

(1-2) Method of Deciding Correction Factor $E^{I/II}$

Figure 2:
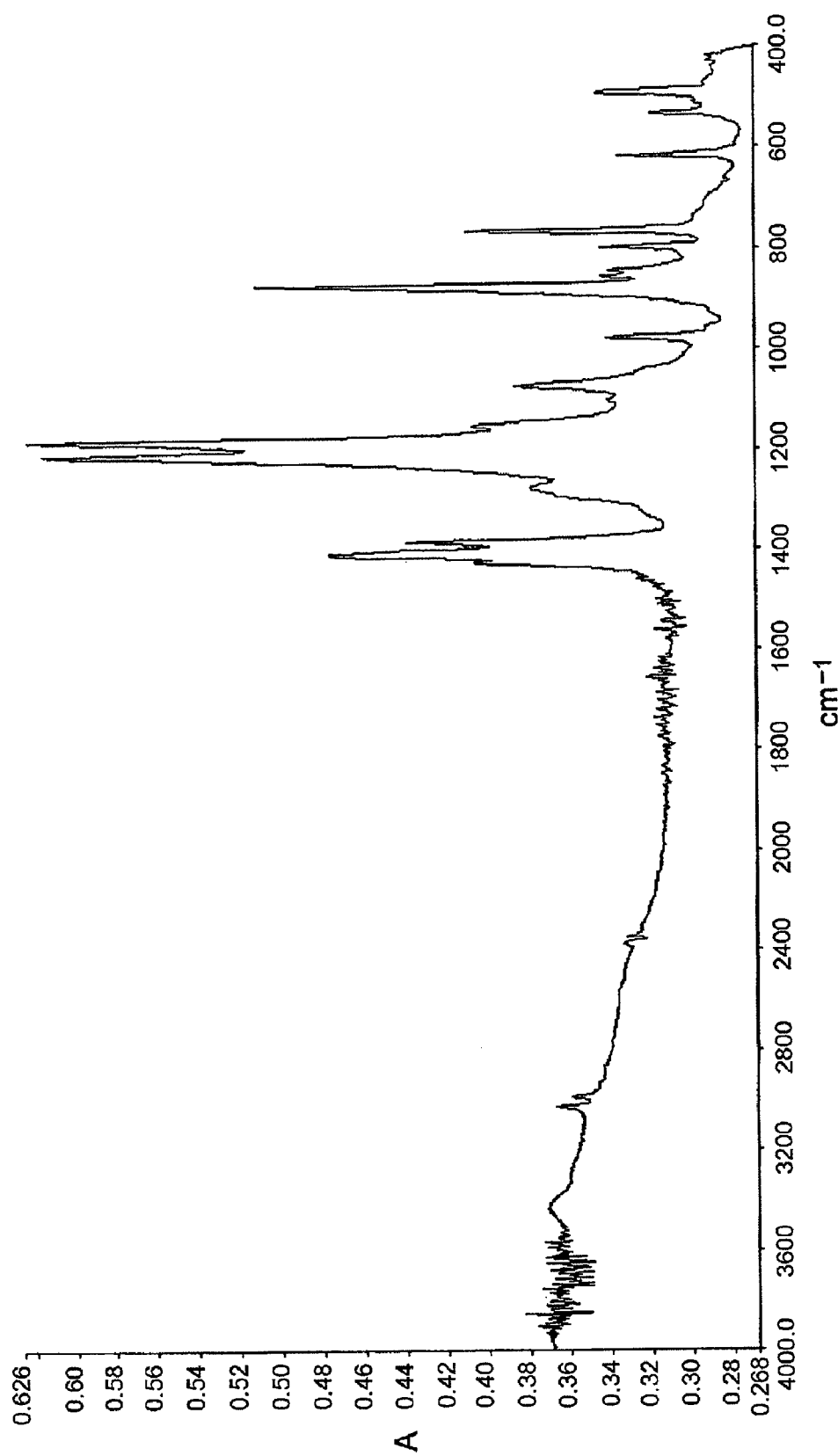
FIG. 2 is an IR chart of vinylidene fluoride homopolymer of all-II-form crystal structure.
Figure 3:
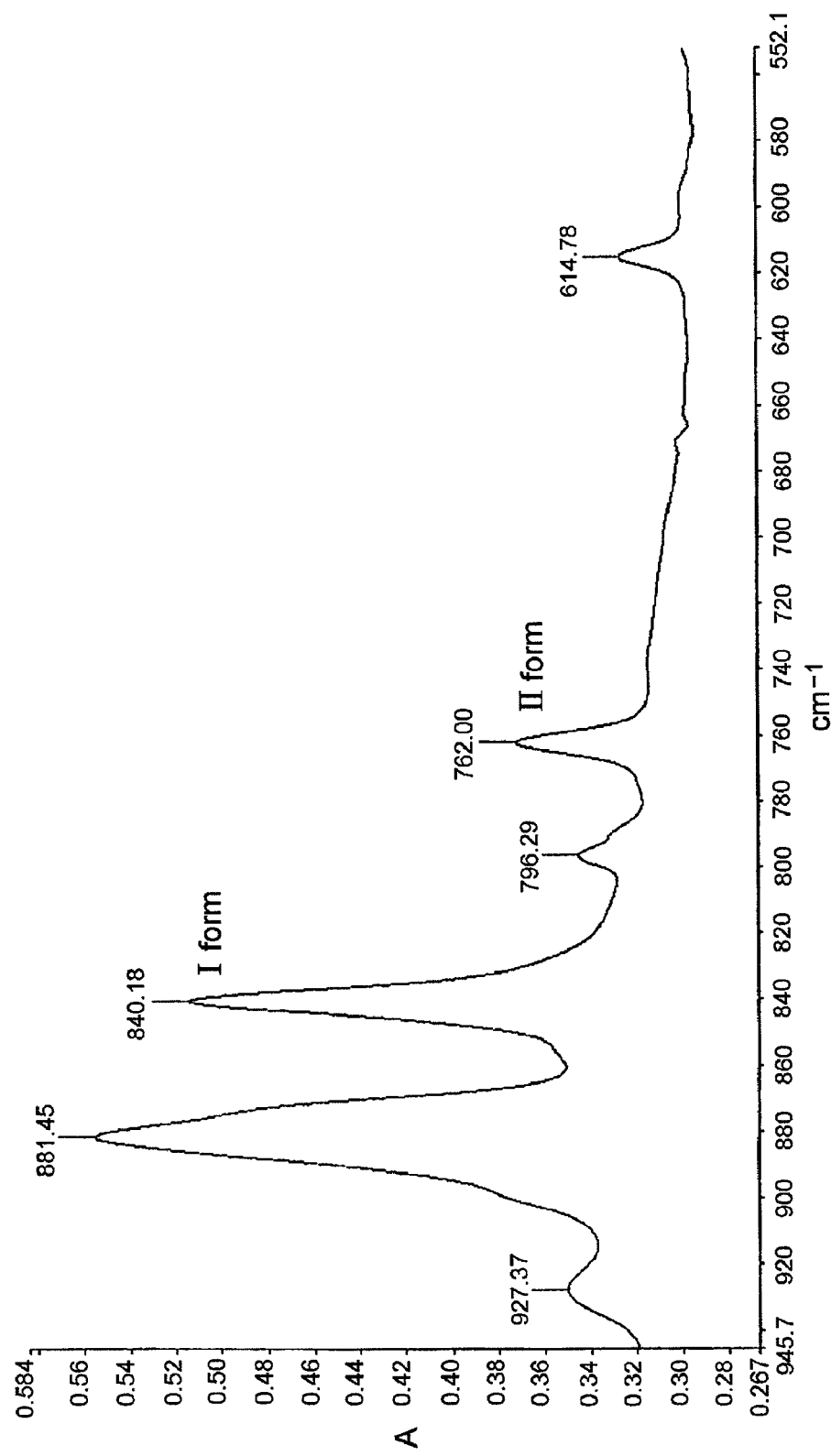
FIG. 3 is an IR chart of vinylidene fluoride homopolymer comprising a mixture of I-form and II-form crystal structures for explaining a method of reading peak heights of characteristic absorption of I-form and II-form crystal structures.

A sample in which the content $F(I)$ of I-form crystal structure is known is prepared by mixing a sample of all-I-form crystal structure (FIG. 1) and a sample of all-II-form crystal structure (FIG. 2), and is subjected to IR analysis. Then absorbances (peak height) $A^I$ and $A^{II}$ of each characteristic absorption are read from the obtained chart (FIG. 3).

Then, the absorbances are substituted in Equation (3-a) obtained from Equation (2-a):

$$E^{I/II} = \frac{A^I \times (1 - F(I))}{A^{II} \times F(I)} \tag{3-a}$$

and the correction factor $E^{I/II}$ is obtained. By changing the mixing ratio of the samples repeatedly, each correction factor $E^{I/II}$ is obtained, and an average value of 1.681 is obtained.

As a characteristic absorption of I-form crystal structure, 840 $cm^{-1}$ is used (Reference bulletin: Bachmann et al., Journal of Applied Physics, Vol. 50, No. 10 (1979)), and 763 $cm^{-1}$ referred to in the mentioned bulletin is used as a characteristic absorption of II-form crystal structure.

(2) Content $F(I)$ of I-Form in a Mixture of I-Form and III-Form

Since a substance consisting of III-form crystal structure is difficult to obtain, a mixture of II-form and III-form is used as a standard substance.

Figure 4:
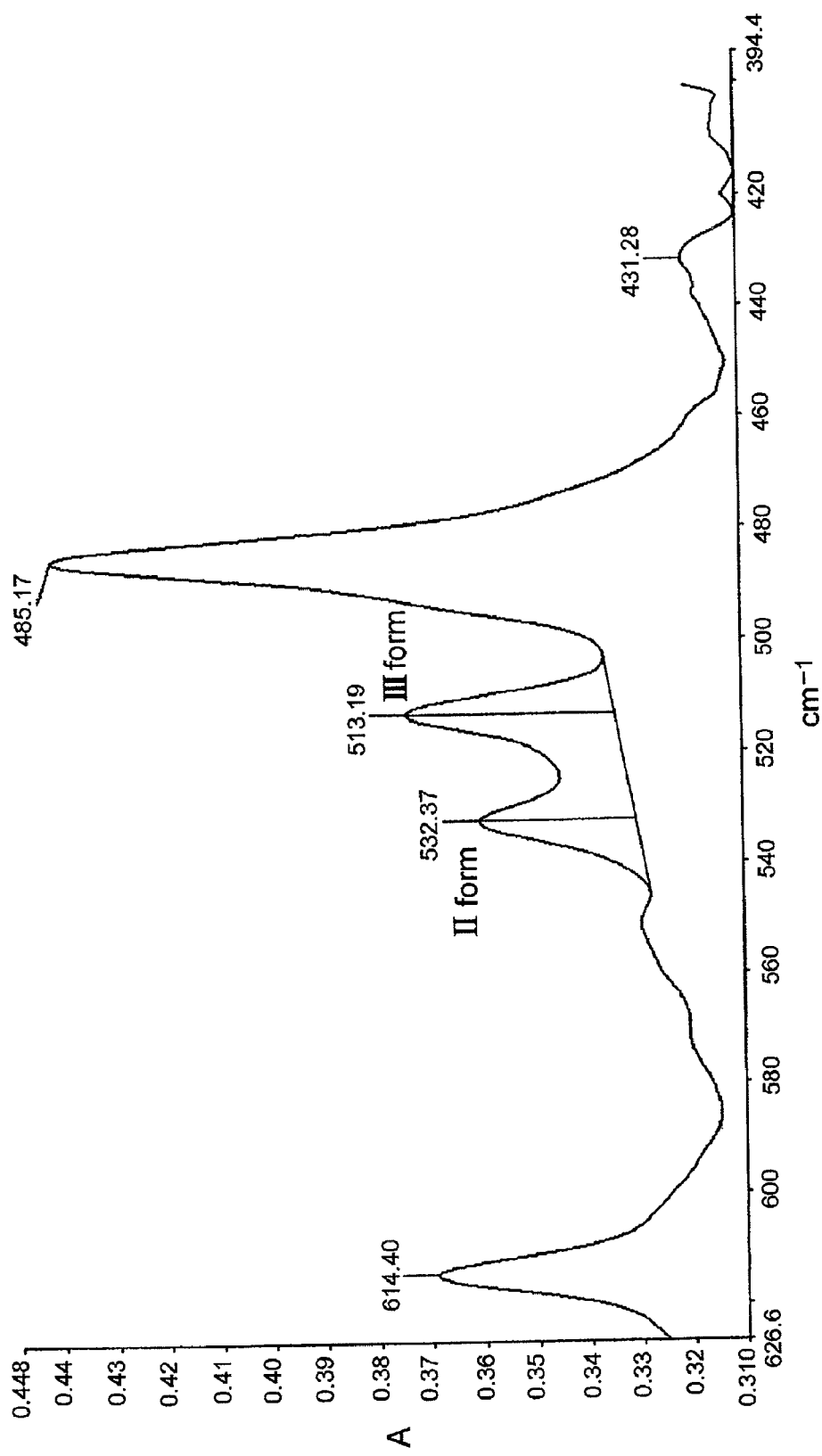
FIG. 4 is an IR chart of vinylidene fluoride homopolymer comprising a mixture of II-form and III-form crystal structures for explaining a method of reading peak heights of characteristic absorption of II-form and III-form crystal structures.

(2-1) Firstly, in the mentioned equation (2-a), $A^I$ and $A^{II}$ are assumed to be $A^{II}$ and $A^{III}$, respectively, and the correction factor $E^{II/III}$ of the mixture of II-form and III-form is assumed to be 0.81 from a reference bulletin (S. Osaki et al., Journal of Polymer Science: Polymer Physics Edition, Vol. 13, pp. 1071 to 1083 (1975). The content of III-form crystal structure in the standard mixture of II-form and III-form is calculated by substituting $A^{II}$ and $A^{III}$ which are read from the IR chart (FIG. 4) of the standard mixture of II-form and III-form, in the equation (F(III)=0.573). As a characteristic absorption of III-form crystal structure, 811 $cm^{-1}$ is used (Reference bulletin: Bachmann et al., Journal of Applied Physics, Vol. 50, No. 10 (1979)).

Figure 5:
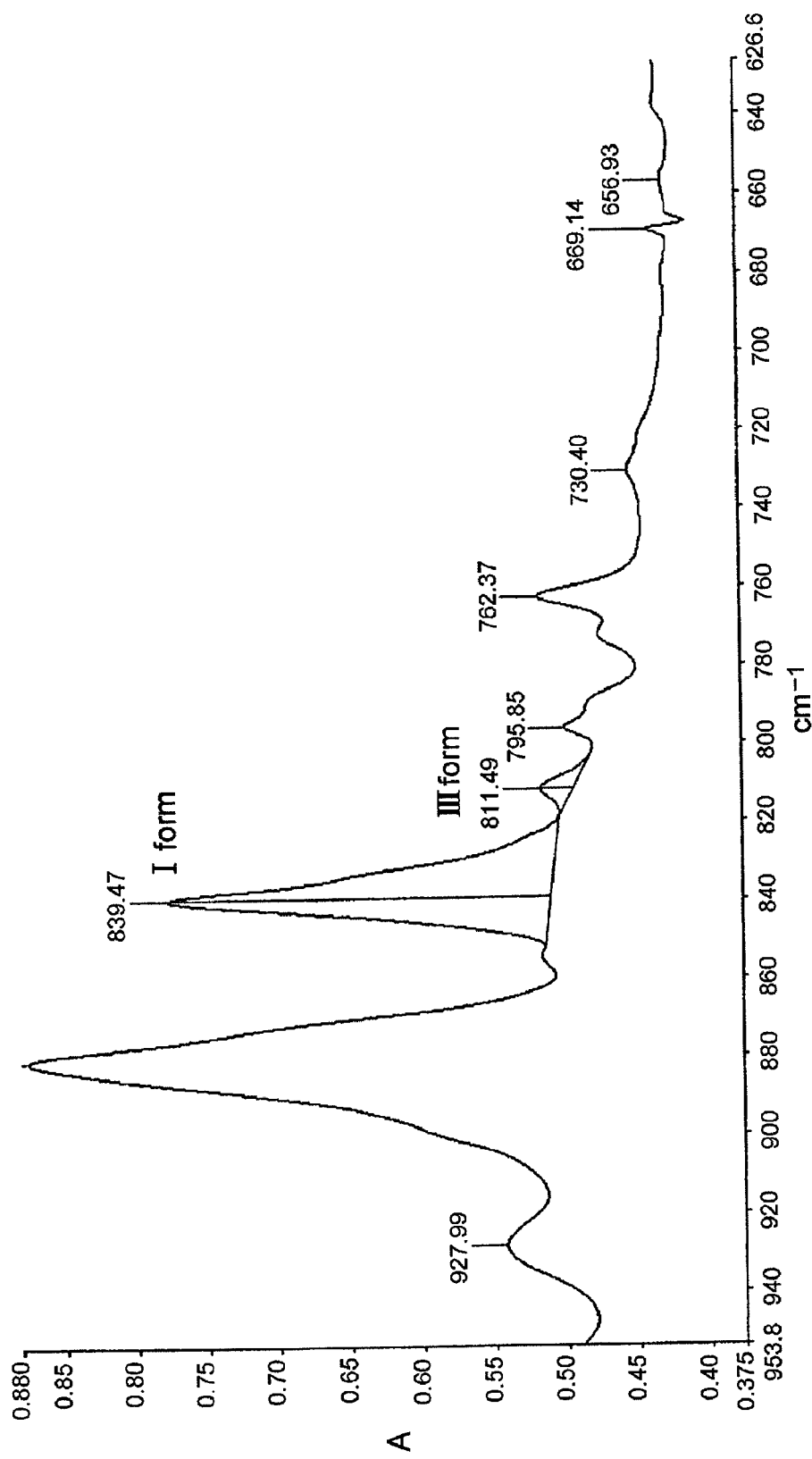
FIG. 5 is an IR chart of vinylidene fluoride homopolymer comprising a mixture of I-form, II-form and III-form crystal structures, in which a content F(I) of I-form crystal structure is known, for explaining a method of reading peak heights of characteristic absorption of I-form and III-form crystal structures.

(2-2) Next, the standard mixture of II-form and III-form in which the content of III-form is known is mixed with a substance of all-I-form crystal structure in a specific ratio to prepare a mixture of I-form, II-form and III-form, in which the content of I-form is known. This mixture is subjected to IR analysis and $A^I$ and $A^{III}$ are read from the chart (FIG. 5) and the correction factor $E^{I/III}$ $(\epsilon^I/\epsilon^{III})$ is calculated from the mentioned equation (3-a) (note that $A^{II}$ is changed to $A^{III}$). By changing the mixing ratio of the standard mixture of II-form and III-form and the substance of I-form repeatedly, each correction factor $E^{I/III}$ is obtained, and an average value of 6.758 is obtained.

(2-3) By using this correction factor $E^{I/III}$=6.758, the content $F(I)$ of I-form in the mixture of I-form and III-form is obtained from the mentioned equation (2-a) (note that $A^{II}$ is changed to $A^{III}$).

In the present invention, it is preferable that a vinylidene fluoride homopolymer has, at its end, a moiety represented by the formula (1):

wherein $R^1$ is a bivalent organic group, and does not contain a unit of the vinylidene fluoride homopolymer; n is 0 or 1; Y is a hydrogen atom, a halogen atom or an alkyl group which may contain a halogen atom, however when n is 0, Y is not an iodine atom.

$R^1$ is a bivalent organic group (a vinylidene fluoride homopolymer unit is not contained). Examples of the bivalent organic group of $R^1$ are, concretely, alkylene groups such as an ethylene group, a propylene group, a butylene group, and a pentylene group; alkyleneoxyalkylene groups such as a methyleneoxyethylene group, a methyleneoxypropylene group, and an ethyleneoxypropylene group; arylenealkylene groups such as a phenyleneethylene group, a phenylenepropylene group, and a phenylenebutylene group; and aryleneoxyalkylene groups such as a phenyleneoxyethylene group and a phenyleneoxypropylene group. An ethylene group and a propylene group are preferable. In addition, a part of hydrogen atoms in these groups may be substituted with fluorine atoms.

Y is a hydrogen atom, a halogen atom, or an alkyl group which may contain a halogen atom.

It is advantageous that the number of carbon atoms of the alkyl group which may contain a halogen atom is not less than 1, and preferably not more than 5, further preferably not more than 2, from the viewpoint of enhancing a purity of the I-form crystal structures.

More specifically, the following examples are preferable as a molecular structure of the alkyl group:

(i) a linear or branched alkyl group represented by the general formula: $C_nH_{2n+1}$ (n=1 to 5), wherein a part or the whole of hydrogen atoms may be substituted with any of fluorine atoms, chlorine atoms, and bromine atoms; and (ii) a linear or branched alkyl group which is represented by the general formula: $C_nH_{2n}I$ (n=1 to 5), and has iodine atom at its end, wherein a part or the whole of hydrogen atoms may be substituted with any of fluorine atoms, chlorine atoms, and bromine atoms.

Concrete examples thereof are, for instance, a hydrogen atom; alkyl groups such as $CH_3$, $CH_2CH_3$, $CH(CH_3)_2$, $CH_2CH_2CH_3$, $CH_2CH_2CH_2CH_3$, and $CH_2CH_2CH_2CH_2CH_3$; a fluorine atom; fluorine-containing alkyl groups such as $CF_3$, $CF(CH_3)_2$, $CH(CF_3)(CH_3)$, $CH(CF_3)_2$, $CF(CF_3)_2$, $CH_2CF_3$, $CH_2CH_2CH_2CF_3$, $CH_2CH_2CH_2CH_2CF_3$, $CH_2CF_2CF_2CH_2CF_3$, $CH_2CF_2CF_2CF_2CF_3$, and $CF_2CF_2CF_2CF_2CF_3$; and end-iodinated alkyl groups such as $CH_2CH_2I$ and $CH_2CH_2CH_2I$.

Among these, a hydrogen atom, a fluorine atom, $CH_3$, $CH_2CH_3$, $CF_3$, and $CH_2CF_3$ are preferable from the viewpoint of improvement in a purity of I-form crystal structures.

When attention is given to recurring units of only vinylidene fluoride in the vinylidene fluoride homopolymer, a lower limit of number average degree of polymerization thereof is preferably 4, more preferably 5, particularly preferably 7, and an upper limit thereof is preferably 20, further more preferably 17. In the case of utilizing the vinylidene fluoride homopolymer as a ferroelectric material, a lower limit of number average degree of polymerization thereof is preferably 4, particularly preferably 7, and an upper limit thereof is preferably 20, more preferably 17, and further preferably 15. When the number average degree of polymerization is too high, a ratio of I-form crystal structures may be decreased in some cases.

The vinylidene fluoride homopolymer used in the present invention as a starting material may comprise II-form alone, may be a mixture of I-form and II-form, or may further contain III-form.

The vinylidene fluoride homopolymer as a starting material can be prepared, for instance, by producing a vinylidene fluoride homopolymer having an iodine atom or a fluorine atom at its end, and then, modifying the end into the moiety represented by the above-described formula (I).

Herein, the modification of the end may proceed by a single-stage reaction, or the end may be modified into the desirable end group after modifying into another end group once. The method of modification is described later.

A process for preparing a vinylidene fluoride homopolymer comprising I-form crystal structures alone or comprising I-form crystal structures as the main component and having iodine atom or bromine atom at its end is developed by the present inventors.

Namely, the vinylidene fluoride homopolymer having iodine atom or bromine atom at its end and comprising I-form crystal structures alone or comprising the structures in an amount of not less than 50% by mass can be obtained by radically polymerizing vinylidene fluoride in the presence of, as a chain transfer agent (telogen), an iodine compound or a bromine compound represented by the formula (1A);

$$R^9-X^{10} \quad (1A)$$

wherein $R^9$ is a monovalent organic group, but does not contain a unit of vinylidene fluoride homopolymer comprising I-form crystal structures alone or comprising the structures as the main component; $X^{10}$ is an iodine atom or a bromine atom, or an iodine compound or a bromine compound represented by the formula (1B);

$$X^{10}-R^2-X^{10} \quad (1B)$$

wherein $R^2$ is a bivalent organic group, but does not contain a unit of vinylidene fluoride homopolymer comprising I-form crystal structures alone or comprising the structures as the main component; $X^{10}$ is an iodine atom or a bromine atom.

In the above description, a vinylidene fluoride homopolymer as a starting material having iodine atom or bromine atom at its end and comprising I-form crystal structures alone or comprising the structures as the main component is explained, and as described above and later, in the preparation process of the present invention for precipitating by dissolving in a specific solvent, as long as vinylidene fluoride homopolymer is used, the crystal structure thereof may comprise II-form alone, may be a mixture of I-from and II-form, or may further contain III-form.

These vinylidene fluoride homopolymers comprising II-form crystal structures alone or comprising the structures as part thereof are prepared by modifying an end of a known vinylidene fluoride homopolymer having an iodine atom or bromine atom at its end and comprising II crystal-form structures, into the moiety represented by the above-described formula (1) (for instance, described in Shigematsu et al., Jpn. J. Appl. Phys., 39, 6358 (2000)).

The preparation process of the present invention is a process comprising dissolving a vinylidene fluoride homopolymer of an I-form crystal structure having a number average degree of polymerization of 3 to 20, which preferably comprises the moiety (1) at least in one end thereof, in an organic solvent, and then evaporating the organic solvent.

The vinylidene fluoride homopolymer may be dissolved in an organic solvent as a polymerized reaction product (green powder product) as is, or may be dissolved after applying a step of some treatments to the vinylidene fluoride homopolymer.

Examples of steps for such treatments added are, for instance, a washing step for removing low molecular weight impurities in the green polymer powder, and in addition, a separation step for separating the vinylidene fluoride homopolymers into those having specific molecular weight, steps for re-precipitation and re-crystallization, a heating step for drying, a vacuum treatment step, a heat-treatment step for crystal growth and the like.

In the present invention, the organic solvent dissolving the vinylidene fluoride homopolymer of I-form crystal structure is a solvent comprising an organic solvent having a dipole moment of not less than 2.8 alone or comprising the organic solvent as a part thereof. The reason why the I-form crystal structure can be obtained at a high purity by using a solvent comprising an organic solvent having a dipole moment of not less than 2.8 alone or comprising the organic solvent as a part thereof is unclear.

With respect to the values of the dipole moment used in the present invention, mainly those described in Kagaku Binran (Handbook of Chemistry), Basic, 3rd revised edition (edited by the Chemical Society of Japan: Maruzen) and CRC Handbook of Chemistry and Physics (edited by: Lide, David R.: CRC Press) are adopted.

Examples of an organic solvent having a dipole moment of not less than 2.8 are, for example, one kind selected from dimethylformamide (dipole moment=3.82), acetonitrile (3.92), acetone (2.88), dimethylacetamide (3.81), dimethylsulfoxide (3.96), hexamethyl phosphoramide (5.39), N-methyl-2-pyrrolidone (4.09), and tetramethylurea (3.47), and a solvent mixture of at least two kinds thereof. Among these, from the viewpoint that productivity of the I-form crystal structure is high, a dipole moment of the organic solvent is preferably not less than 3.0, more preferably not less than 3.5, and particularly not less than 3.7.

In the present invention, a solvent comprising an organic solvent having a dipole moment of not less than 2.8 as a part thereof can also be effectively used. In this solvent mixture, if the organic solvent having a dipole moment of not less than 2.8 is contained in an amount of not less than 5% by mass, further not less than 10% by mass, and particularly not less than 30% by mass, an effect of high purification of I-form crystal structures comparable to single use of the organic solvent having a dipole moment of not less than 2.8 can be exhibited.

As other organic solvents to be mixed, an organic solvent having a lower boiling point than the organic solvent used in combination having a dipole moment of not less than 2.8 is preferable, and examples thereof are methyl ethyl ketone (MEK), tetrahydrofuran (THF), ethyl acetate, acetic acid, pyridine, cyclopentanone, cyclohexanone, butyl acetate, polyethylene glycol methyl ether acrylate (PEGMEA), methyl amyl ketone (MAK) and the like.

A dissolving temperature is generally −30° C. to 150° C., preferably 0° C. to 80° C., and more preferably 25° C. to 50° C. When the dissolving temperature is too high, there is a tendency that decomposition is caused on the vinylidene fluoride homopolymer or the solvent, and when it is too low, there are tendencies that the solvent is solidified, the viscosity thereof is increased, or the vinylidene fluoride homopolymer is hardly dissolved.

A concentration of the vinylidene fluoride homopolymer solution may be suitably selected according to a kind of an organic solvent or a dissolving temperature, and even when the homopolymer is dissolved up to the saturated dissolution point, effects of the present invention can be exhibited. A favorable concentration is not less than 0.1% by mass, preferably not less than 0.5% by mass, more preferably not less than 1% by mass, and not more than 50% by mass, preferably not more than 30% by mass, more preferably not more than 20% by mass.

In the preparation process of the present invention, a vinylidene fluoride homopolymer is then precipitated by evaporating an organic solvent from this solution.

A method of evaporating the organic solvent is not particularly limited, and general methods, for instance, a method of leaving in an open system under an atmospheric pressure, a method of leaving in a closed system under an atmospheric pressure, a method of evaporating at room temperature under reduced pressure, and a method of evaporating with heating under reduced pressure can be adopted. However, when the solution is heated to a high temperature, there is a tendency that a precipitated vinylidene fluoride homopolymer itself is melted, therefore, it is preferable to adopt a temperature at which the vinylidene fluoride homopolymer is not melted regardless of surrounding pressures, and concretely, the temperature is not less than 0° C., preferably not less than 25° C., more preferably not less than 30° C., and not more than 150° C., preferably not more than 100° C., and more preferably not more than 50° C.

The surrounding pressure is preferably an atmospheric pressure, and particularly preferably under reduced pressure from the viewpoint of lowering an evaporation temperature. The surrounding pressure is preferably not less than 0.0013 Pa, further preferably not less than 0.133 kPa, particularly preferably not less than 1.333 kPa, and preferably not more than an atmospheric pressure, further preferably not more than 9.333 kPa, particularly preferably not more than 6.666 kPa.

It is desirable to carry out evaporation taking time until the solvent is sufficiently removed from the viewpoint of preventing lowering of electrical properties, particularly ferroelectric characteristics due to a remaining solvent.

The vinylidene fluoride homopolymer precipitated by removing the organic solvent by sufficient evaporation becomes a vinylidene fluoride homopolymer comprising the I-form crystal structure of a purity as high as not less than 70% by mass, regardless of the content of I-form crystal structures in a starting material. A proportion of the I-form crystal structures in the product may be decided according to intended objects, and the proportion is preferably not less than 80% by mass, more preferably not less than 90% by mass, further more preferably not less than 95% by mass, and particularly preferably 100% by mass.

The content of I-form crystal structures in the starting material is not necessarily less than 70% by mass, and if the preparation process of the present invention is applied to a starting material comprising the I-form crystal structure in an amount of not less than 70% by mass, the purity thereof can be further increased.

The vinylidene fluoride homopolymer comprising the I-form structures at high purity obtained by the preparation process of the present invention is obtained in the form of an aggregate of vinylidene fluoride homopolymers having I-form crystal structures.

Accordingly, by applying a solution of the vinylidene fluoride homopolymer on a substrate and evaporating the solvent, a thin film of vinylidene fluoride homopolymer having I-form crystal structures at high purity can be formed on the substrate.

Namely, the present invention further relates to the method of forming a thin film of a vinylidene fluoride homopolymer comprising I-form crystal structures in an amount of not less than 70% by mass, characterized in that a vinylidene fluoride homopolymer having a number average degree of polymerization of 3 to 20 is dissolved in a solvent comprising an organic solvent having a dipole moment of not less than 2.8 alone or comprising the organic solvent as a part thereof, and thereafter, the vinylidene fluoride homopolymer solution is applied on a substrate, and the solvent is evaporated.

In addition, even when other polymer soluble in the organic solvent is dissolved together, an obtained thin film shows ferroelectricity, thus, improvements in hardness of the thin film and processability in forming a film can be attained.

The other polymer may be a ferroelectric polymer, a non-ferroelectric polymer, or a mixture of both of the polymers. Or, it may be a polymer showing electrical and optical functionality other than ferroelectricity such as a liquid crystal polymer and a conductive polymer.

When the other polymer is a ferroelectric polymer, ferroelectricity is improved more than the case of a thin film comprising a ferroelectric polymer alone. When other polymer is a non-ferroelectric polymer, ferroelectricity is exhibited in the formed thin film.

Examples of the other ferroelectric polymer soluble in an organic solvent are, for instance, fluorine-containing polymers such as vinylidene fluoride homopolymers other than the above-mentioned specific vinylidene fluoride homopolymers to be used in the present invention among vinylidene fluoride homopolymers, for example, a high molecular weight polyvinylidene fluoride having a number average degree of polymerization of more than 20, a vinylidene fluoride-trifluoroethylene copolymer, a vinylidene fluoride-tetrafluoroethylene copolymer, a vinylidene fluoride-vinyl fluoride copolymer and a vinylidene fluoride-tetrafluoroethylene-hexafluoropropylene copolymer; cyano polymers such as vinylidenecyanamide-vinylene acetate copolymer; odd nylons such as nylon 9 and nylon 11; aromatic polyamide and the like. Among these, fluorine-containing polymers, particularly a vinylidene fluoride-trifluoroethylene copolymer and a high molecular weight polyvinylidene fluoride having a number average degree of polymerization of more than 20 are preferable from the viewpoint of showing favorable ferroelectricity.

Examples of the other non-ferroelectric polymer soluble in the organic solvent are polymers which are obtained by polymerizing at least one monomer selected from, for instance, olefin, fluorine-containing olefin, acrylic compounds, methacrylic compounds, fluorine-containing acrylic compounds, fluorine-containing methacrylic compounds, norbornene compounds, organosilane compounds, fluorine-containing norbornene compounds, styrene compounds, fluorine-containing styrene compounds, vinyl ether and fluorine-containing vinyl ether, and do not show ferroelectricity.

Examples of olefin are ethylene and propylene, and examples of fluorine-containing olefin are vinyl fluoride, vinylidene fluoride, trifluoroethylene, chlorotrifluoroethylene, tetrafluoroethylene, hexafluoropropylene, and hexafluoroisobutene.

Acrylic compounds and methacrylic compounds can be used without particular limitation regarding a side chain thereof, and acrylic ester and methacrylic acid ester can be used without particular limitation regarding an ester moiety thereof. Concrete examples are, for instance, alkyl esters of acrylic acid or methacrylic acid such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, n-hexyl acrylate, n-hexyl methacrylate, n-octyl acrylate, n-octyl methacrylate, 2-ethylhexyl acrylate, 2-ethylhexyl methacrylate, lauryl acrylate, lauryl methacrylate, 2-hydroxyethyl acrylate, 2-hydroxyethyl methacrylate, 2-hydroxypropyl acrylate, 2-hydroxypropyl methacrylate, t-butyl acrylate, and t-butyl methacrylate; acrylic ester or methacrylic ester containing an ethylene glycol group, a propylene glycol group, or a tetramethylene glycol group; acrylic ester containing an alkoxysilane group, or methacrylic acid ester containing an alkoxysilane group; acrylic ester or methacrylic acid ester containing a ring structure such as 3-oxocyclohexyl acrylate, 3-oxocyclohexyl methacrylate, adamantyl acrylate, adamantyl methacrylate, alkyladamantyl acrylate, alkyladamantyl methacrylate, cyclohexyl acrylate, cyclohexyl methacrylate, tricyclodecanyl acrylate, tricyclodecanyl methacrylate, and acrylic ester or methacrylic acid ester containing a lactone ring or a norbornene ring; unsaturated amide such as acryl amide, methacryl amide, N-methylolacrylamide, N-methylolmethacrylamide, and diacetoneacrylamide; and acrylonitrile, methacrylonitrile, vinylsilane containing an alkoxysilane group, acrylic acid, methacrylic acid and the like. Further, examples of the above acrylate compounds containing an α-cyano group and analogous compounds thereof are maleic acid, fumaric acid, and maleic anhydride.

Fluorine-containing acrylic compounds and fluorine-containing methacrylic compounds can be used without particular limitation regarding a side chain thereof, and fluorine-containing acrylic ester and fluorine-containing methacrylic acid ester can be used without particular limitation regarding an ester moiety thereof. Examples of fluorine-containing acrylic ester and fluorine-containing methacrylic acid ester are fluorine-containing acrylic ester and fluorine-containing methacrylic acid ester containing a group having a fluorine atom at α position of an acrylic acid, and fluorine-containing acrylic ester and fluorine-containing methacrylic ester having a fluorine atom at an ester moiety. In the latter case, a cyano group may be introduced in an α position.

An example of the fluorine-containing acrylic ester or fluorine-containing methacrylic acid ester in which a fluorine-containing alkyl group is introduced in an α position is the above-described non-fluorine-containing acrylic ester or methacrylic acid ester, in which a trifluoromethyl group, a trifluoroethyl group, a nonafluoro-n-butyl group or the like is bonded to an α position.

Examples of a fluorine-containing ester moiety are a fluorine-containing alkyl group which is a perfluoroalkyl group or a fluoroalkyl group; and, a moiety in which a ring structure and a fluorine atom coexist in the ester moiety, and the ring structure is, for example, a fluorine-containing benzene ring, a fluorine-containing cyclopentane ring, a fluorine-containing cyclohexane ring, or a fluorine-containing cycloheptane ring which is substituted with a fluorine atom or a trifluoromethyl group.

Among fluorine-containing acrylic esters and fluorine-containing methacrylic acid esters, particularly representative examples thereof are fluorine-containing acrylic esters such as 2,2,2-trifluoroethyl acrylate, 2,2,3,3-tetrafluoropropyl acrylate, 1,1,1,3,3,3-hexafluoroisopropyl acrylate, heptafluoroisopropyl acrylate, 1,1-dihydroheptafluoro-n-butyl acrylate, 1,1,5-trihydrooctafluoro-n-pentyl acrylate, 1,1,2,2-tetrahydrotridecafluoro-n-octyl acrylate, 1,1,2,2-tetrahydroheptadecafluoro-n-decyl acrylate, and perfluorocyclohexylmethyl acrylate; and fluorine-containing methacrylic acid esters such as 2,2,2-trifluoroethyl methacrylate, 2,2,3,3-tetrafluoropropyl methacrylate, 1,1,1,3,3,3-hexafluoroisopropyl methacrylate, heptafluoroisopropyl methacrylate, 1,1-dihydroheptafluoro-n-butyl methacrylate, 1,1,5-trihydrooctafluoro-n-pentyl methacrylate, 1,1,2,2-tetrahydrotridecafluoro-n-octyl methacrylate, 1,1,2,2-tetrahydroheptadecafluoro-n-decyl methacrylate, and perfluorocyclohexylmethyl methacrylate.

A norbornene compound and a fluorine-containing norbornene compound contain a single nuclear structure or plural nuclear structures. Herein, there are employed norbornene compounds obtained by a Diels Alder addition reaction of an allyl alcohol, a fluorine-containing allyl alcohol, acrylic acid, α-fluoroacrylic acid, or any of all the unsaturated compounds described in the present specification such as acrylic acid, methacrylic acid, fluorine-containing acrylic esters and fluorine-containing methacrylic esters, with cyclopentadiene or cyclohexadiene.

Examples of styrene compounds and fluorine-containing styrene compounds are styrene, fluorinated styrene, hydroxystyrene and in addition, styrene compounds to which hexafluoroacetone is added, styrene or hydroxystyrene in which hydrogen is substituted with a trifluoromethyl group, and the above styrene and fluorine-containing styrene compounds to which halogen, an alkyl group, or a fluorine-containing alkyl group is bonded in an α-position.

A vinyl ether and a fluorine-containing vinyl ether are alkylvinyl ethers which may contain a hydroxyl group such as a methyl group, an ethyl group, a hydroxyethyl group, and a hydroxybutyl group, and a part or the whole of hydrogen atoms may be substituted with fluorine atoms. In addition, other examples are a cyclohexylvinyl ether, a cyclic vinyl ether having a hydrogen atom or a carbonyl bond in a cyclic structure thereof, and a monomer in which a part or the whole of hydrogens of a cyclic vinyl ether are substituted with fluorine atoms.

Further, an allyl ether, a vinyl ester, and vinyl silane can be used without particular limitation as long as these are known compounds.

Among polymers obtained using these monomers, from the viewpoint of improving ferroelectricity, it is preferable to use polymers prepared using one or at least two kinds of monomers such as fluorine-containing olefin, acrylic ester, methacrylic acid ester, fluorine-containing acrylic ester, fluorine-containing methacrylic acid ester, fluorine-containing styrene compound, vinyl ether, and fluorine-containing vinyl ether.

A thin film obtained by mixing the above-described specific vinylidene fluoride homopolymer and other polymers can be expected to have properties of the other polymers, for example, enhanced processability such as elongation processability and mechanical strength, in addition to exhibiting or enhancing ferroelectricity. Electrical and optical properties along with ferroelectricity such as electrooptical effects can be also improved.

A concentration of the specific vinylidene fluoride homopolymer in the coating solution varies depending on an intended coating thickness, a viscosity of the coating solution, etc. The concentration is not less than 0.1% by mass, preferably not less than 0.5% by mass, more preferably not less than 1% by mass, and not more than 50% by mass, preferably not more than 30% by mass, more preferably not more than 20% by mass.

When other polymers coexist, the amount of the specific vinylidene fluoride homopolymer varies depending on kinds of other polymers or intended characteristics to be added, and the vinylidene fluoride homopolymer is desirably compounded in order to occupy in an amount of, for example, not less than 5% by mass, preferably not less than 7% by mass, and further more preferably not less than 10% by mass on the basis of the whole mixture of the other polymers and the specific vinylidene fluoride homopolymer. The upper limit is 95% by mass, preferably 90% by mass, and further more preferably 85% by mass from the viewpoint of keeping film properties of a coating film.

For applying those coating solutions on a substrate, there can be used known coating methods such as spin coating, dip coating, spray coating, roll coating and gravure coating. For efficiently forming a thin film, the spin coating method and gravure coating method are preferred, and particularly the spin coating method is preferred.

After application by the above methods, the solvent is removed by evaporation. For the evaporation, conditions therefor explained in the above described preparation methods can be adopted.

It is preferable to dry by heating at a temperature lower than a melting point of a specific vinylidene fluoride homopolymer in forming a thin film. The temperature for drying by heating varies depending on a boiling point of a solvent to be used, and a preferable evaporation temperature is not less than 0° C., preferably not less than 25° C., more preferably not less than 30° C., and not more than 150° C., preferably not more than 100° C., more preferably not more than 50° C.

The thus formed thin film of vinylidene fluoride homopolymer on a substrate by application in the form of a coating solution maintains I-form crystal structures and has an ability to exhibit excellent ferroelectricity.

The kind of substrate is suitably selected according to objects, and intended uses, and selected from ceramic substrates such as glass substrates, resin substrates and the like in addition to silicon substrates or metallic substrates.

For utilizing electrical properties of the thin film of vinylidene fluoride homopolymer, an example of a substrate is preferably an electroconductive substrate capable of forming an electrode. Also insulating substrates such as silicon substrates, ceramics substrates (such as glass substrates), and resin substrates on which a thin film of an electroconductive material is formed are preferred as the electroconductive substrate.

As a metallic material for an electroconductive substrate or an electroconductive thin film, there can be used aluminum, copper, chromium, nickel, zinc, stainless steel, gold, silver, platinum, tantalum, titanium, niobium, molybdenum, indium tin oxide (ITO) and the like. Particularly preferred are silicon wafers on which a thin film of aluminum, gold, silver, platinum, tantalum, titanium or the like is formed. As the metallic substrate, aluminum, copper, gold, silver and platinum are also preferred.

The electroconductive thin films provided on a substrate surface may be previously subjected to patterning of intended circuit by a known method such as photolithography, mask deposition or the like, as case demands.

Thin films of vinylidene fluoride homopolymer having I-form crystal structure are formed on those substrates by the aforementioned method.

As an application method on a substrate, a method of coating in a form of a coating solution (coating material) (coating solution method) is preferably utilized. In addition, the coated thin film may be used together with a substrate, or may be used as a film by peeling off the thin film from the substrate.

A thickness of a thin film of vinylidene fluoride homopolymer having I-form crystal structure is optionally selected depending on an intended object and application of the objective laminated article. The thickness is usually not less than 1 nm, preferably not less than 5 nm, particularly preferably not less than 10 nm, and not more than 10 µm, preferably not more than 1 µm, particularly preferably not more than 500 nm. When the thin film is used as a film, the approximate thickness is generally not less than 0.5 µm, preferably not less than 1 µm, particularly preferably not less than 2 µM, and not more than 100 µm, preferably not more than 80 µm, particularly preferably not more than 50 µm.

Since in the thin film obtained by the forming method of the present invention, mechanical strength is improved, and heat resistance is enhanced, the thin film is applicable to devices having high environmental resistance and high performances, which utilize piezo electric property, pyroelectric property, electro-optical effect and non-linear optical effect, such as FE-RAM, infrared sensor, microphone, speaker, poster with voice, head phone, electronic musical instruments, artificial tactile organ, pulsimeter, hearing aid, hemadynamometer, phonocardiograph, ultrasonic diagnostic device, ultrasonic microscope, ultrasonic hyperthermia equipment, thermograph, micro-earthquake seismometer, landslide preperception meter, proximity warning (distance meter) intruder detector, keyboard switch, bimorph display for underwater communication, sonar, optical shutter, optical fiber voltmeter, hydrophone, ultrasonic optical modulation and polarization device, acoustic delay line, ultrasonic camera, POSFET, accelerometer, tool malfunction sensor, AE detector, sensor for robot, impact sensor, flow meter, vibration meter, ultrasonic flaw detector, ultrasonic thickness meter, fire alarm, intruder detection, piezo-electric vidicon, copying machine, touch panel, endothermic and exothermic reaction detector, optical intensity modulator, optical phase modulator and optical circuit switching element, and a condenser using high dielectric constant.

EXAMPLES

The present invention is now explained by means of synthesis examples and examples, but is not limited to such examples.

First, methods of measuring parameters used in the present invention are explained below.

[1] Method of Measuring a Number Average Degree of Polymerization of Vinylidene Fluoride (VdF) Polymer (1) Number Average Degree of Polymerization (n) of $CF_3(VdF)_nI$ Measured by $^{19}F$-NMR. Concretely calculated by the following equation using a peak area (derived from $CF_3$—) around −61 ppm and a peak area (derived from —$CF_2$—$CH_2$—) around −90 to −96 ppm.

(Number average degree of polymerization)=((Peak area around −90 to −96 ppm)/2)/((Peak area around −61 ppm)/3)

[2] Various Measuring (Analysis) Methods and Equipment
(1) IR Analysis
(1-1) Measuring Conditions KBr method is employed. After 1 to 5 mg of vinylidene fluoride polymer powder is mixed with 100 to 500 mg of KBr powder and pressure is applied for pelletizing, the obtained pellets are fixed to a measuring equipment and measurement is carried out at 25° C.

(1-2) Measuring Equipment

FT-IR spectrometer 1760X manufactured by Perkin Elmer Co., Ltd.

(2) $^1$H-NMR and $^{19}$F-NMR Analyses
(2-1) Measuring Conditions

Measurement is carried out by dissolving 10 to 20 mg of vinylidene fluoride polymer powder in d6-acetone and setting the obtained sample on a probe.

(2-2) Measuring Equipment

AC-300P manufactured by Brucker (3) Powder X-Ray Diffraction Analysis
(3-1) Measuring Conditions Measurement is carried out by applying vinylidene fluoride polymer powder on a glass plate for specific use for this analysis and setting the glass plate on the measuring equipment.

(3-2) Measuring Equipment

Rotaflex manufactured by Rigaku Co.

(4) Ferroelectricity Measuring Equipment
(4-1) Measuring Conditions

Measurement is carried out by forming a thin film by coating a substance showing ferroelectricity on a substrate on which an aluminum electrode (lower electrode) is formed, then forming an aluminum electrode (upper electrode) thereon by vacuum deposition to prepare a sample with an electrode, and setting this sample on the measuring equipment.

(4-2) Measuring Equipment

FCE-1 manufactured by TOYO Corporation

Synthesis Example 1

Synthesis of $CF_3(VdF)_{15}I$

Into a 300 ml stainless steel autoclave equipped with a valve, pressure gauge and thermometer was poured 50 g of HCFC-225, and while cooling with a dry ice/methanol solution, 0.27 g of di-n-propylperoxy dicarbonate (50% by mass of methanol solution) was added and the inside of a system was sufficiently replaced with nitrogen gas. After the inside pressure of the system was reduced, 2.5 g of $CF_3I$ was introduced through the valve, and after heating the system up to 45° C., VdF was introduced until the inside pressure of the system became 0.8 MPaG. While maintaining the inside pressure and temperature of the system at 0.8 MPaG and 45° C., respectively, VdF was continuously supplied and a 9-hour reaction was carried out.

After completion of the reaction, the inside temperature of the system was decreased to 25° C. and the unreacted substances (VdF and $CF_3I$) were released. Then the precipitated solid reaction product (VdF polymer) was taken out and subjected to vacuum drying in a desiccator until a constant weight was reached to obtain 12.2 g of VdF polymer.

With respect to this VdF polymer, a number average degree (n) of polymerization obtained by $^{19}$F-NMR analysis was 14.6.

With respect to this VdF polymer, IR analysis was carried out. As a result, both peaks which were characteristic to I-form and II-form crystal structures were recognized and it was confirmed that I-form crystal structures and II-form crystal structures were mixed. Further the calculated content (F(I)) of I-form crystal structures was 60% by mass.

Synthesis Example 2

Synthesis of $CF_3(VdF)_{15}C_2H_4I$

Into a 300 ml stainless steel autoclave equipped with a valve, pressure gauge and thermometer were poured 3.0 g of vinylidene fluoride oligomer (n=15) obtained in Synthesis Example 1, 30 g of ethyl acetate and 0.021 g of AIBN while the temperature inside a system was maintained at 25° C., and the inside of the system was sufficiently replaced with nitrogen gas. Then, the inside pressure of the system was reduced, and the inside temperature was increased up to 65° C., ethylene gas was introduced until the inside pressure of the system became 0.7 MPaG. While maintaining the inside pressure and temperature of the system at 0.7 MPaG and 65° C., respectively, ethylene gas was continuously introduced and a 5-hour reaction was carried out.

After completion of the reaction, the inside temperature of the system was decreased to 25° C. and the unreacted ethylene gas was released. Then, the ethyl acetate solution in the system was poured into hexane and the precipitated solid reaction product (hereinafter referred to as "vinylidene fluoride oligomer/ethylene adduct") was taken out by filtration. The vinylidene fluoride oligomer/ethylene adduct was subjected to vacuum drying in a desiccator until a constant weight was reached, and 2.8 g of the adduct was obtained.

According to $^1$H-NMR and $^{19}$F-NMR analyses of this vinylidene fluoride oligomer/ethylene adduct, it was recognized that the peak around −38 ppm derived from the end —$CF_2I$ had disappeared and peaks derived from the added ethylene were observed at around 3.4 to 3.2 ppm and 2.8 to 2.6 ppm by $^1$H-NMR. In this case, an end modification ratio obtained by $^1$H-NMR was 96%.

With respect to this VdF polymer, IR analysis was carried out. As a result, both peaks which were characteristic to I-form and II-form crystal structures were recognized and it was confirmed that I-form crystal structures and II-form crystal structures were mixed. Further the calculated content (F(I)) of I-form crystal structures was 52% by mass.

Synthesis Example 3

Synthesis of $CF_3(VdF)_{15}C_2H_5$

Into a 50 ml four-necked flask equipped with a reflux condenser, thermometer, stirrer and dropping funnel were poured 30 ml of acetic acid, 0.5 g of vinylidene fluoride oligomer/ethylene adduct: $CF_3(VdF)_{15}C_2H_4I$ synthesized in Synthesis Example 2 and 0.33 g of zinc powder, and a 4-hour refluxing with heating was carried out.

After completion of the reaction, the inside temperature of a system was decreased to 25° C. and the zinc powder was removed by filtration. Then, the reaction product, i.e. acetic acid solution was poured into pure water and the solid reaction product was taken out by re-precipitation. The solid reaction product was subjected to vacuum drying in a desiccator until a constant weight was reached, and 0.31 g of the reaction product was obtained.

According to $^1$H-NMR analysis of this solid reaction product, it was recognized that the peaks derived from the added ethylene around 3.4 to 3.2 ppm and 2.8 to 2.6 ppm had disappeared, the peak derived from the end methyl group was observed at around 1.1 to 0.8 ppm, and the end iodine of the vinylidene fluoride oligomer/ethylene adduct had been converted to a proton. In this case, an end modification ratio obtained by $^1$H-NMR was 98%.

With respect to this VdF polymer, IR analysis was carried out. As a result, both peaks which were characteristic to I-form and II-form crystal structures were recognized and it was confirmed that I-form crystal structures and II-form crystal structures were mixed. Further the calculated content (F(I)) of I-form crystal structures was 57% by mass Example 1

$CF_3(VdF)_{15}C_2H_5$ green powder (containing 57% by mass of I-form crystal structures) synthesized in Synthesis Example 3 was dissolved in a solvent shown in Table 1 to be 10% by mass at 25° C.

Then, about 30 mg of the above solution was dropped onto a silicon substrate fixed to a spin coater, and a thin film was formed under the conditions of spin coating at 1000 rpm for 1 second and then at 2000 rpm for 30 seconds. After completion of the spin coating, drying (about 14.6 kPa; 25° C.) was carried out in a desiccator under reduced pressure for one hour to distill off the remaining solvent.

The thin film formed on the silicon substrate was peeled off, and the content of I-form crystal structures was obtained by IR analysis according to KBr method. Results are shown in Table 1.

Comparative Example 1

$CF_3(VdF)_{15}I$ green powder (containing 60% by mass of I-form crystal structures) synthesized in Synthesis Example 1 was dissolved in a solvent shown in Table 1 to be 10% by mass at 25° C.

Then, about 30 mg of the above solution was dropped onto a silicon substrate fixed to a spin coater, and a thin film was formed under the conditions of spin coating at 1000 rpm for 1 second and then at 2000 rpm for 30 seconds. After completion of the spin coating, drying (about 14.6 kPa; 25° C.) was carried out in a desiccator under reduced pressure for one hour to distill off the remaining solvent.

The thin film formed on the silicon substrate was peeled off, and the content of I-form crystal structures was obtained by IR analysis according to KBr method. Results are shown in Table 1.

Solvents shown in Table 1 are abbreviated as the following solvents.

TABLE 1

| | Solute | Solvent | Dipole moment (D) | I-form ratio (% by mass) |
|---|---|---|---|---|
| Ex. 1 | $CF_3(VdF)_{15}$ $CH_2CH_3$ | | | |
| Experiment No. 1-1 | | DMF | 3.82 | 100 |
| Experiment No. 1-2 | | Acetonitrile | 3.92 | 100 |
| Experiment No. 1-3 | | DMA | 3.81 | 100 |
| Experiment No. 1-4 | | Acetone | 2.88 | 86 |
| Experiment No. 1-5 | | THF | 1.75 | 21 |
| Experiment No. 1-6 | | DMF:MEK = 75:25 | — | 100 |
| Experiment No. 1-7 | | DMF:MEK = 1:1 | — | 100 |
| Experiment No. 1-8 | | DMF:MEK = 8:92 | — | 100 |
| Experiment No. 1-9 | | DMF:THF = 1:1 | — | 100 |
| Com. Ex. 1 | $CF_3(VdF)_{15}I$ | DMF | 3.82 | 39 |

DMF: dimethylformamide
DMA: dimethylacetamide
THF: tetrahydrofuran
MEK: methyl ethyl ketone Example 2

About 30 mg of a DMF solution containing 10% by mass of vinylidene fluoride oligomer prepared in Experiment No. 1-1 in Example 1 was dropped onto a silicon substrate, a glass substrate, and an aluminum substrate, and drying (about 14.6 kPa: 25° C.) was carried out in a desiccator under reduced pressure for one hour to distill off the remaining solvent. Thin films formed on the substrates were peeled off, and contents of I-form crystal structures were obtained by IR analysis according to KBr method.

On the aluminum substrate, a thin film was formed in the same manner as above with 10% by mass of a solution using a solvent mixture of DMF:MEK=1:9 (mass ratio), and the content of I-form crystal structure was obtained.

Results are shown in Table 2.

TABLE 2

| | Solute | Substrate | Solvent | I-form ratio (% by mass) |
|---|---|---|---|---|
| Ex. 2 | $CF_3(VdF)_{15}$ $CH_2CH_3$ | | | |
| Experiment No. 2-1 | | Silicon | DMF | 100 |
| Experiment No. 2-2 | | Glass | DMF | 100 |
| Experiment No. 2-3 | | Aluminum | DMF | 100 |
| Experiment No. 2-4 | | Aluminum | DMF:MEK = 1:9 | 100 |

Example 3

100 parts by mass of $CF_3(VdF)_{15}C_2H_5$ green powder (containing 57% by mass of I-form crystal structures) synthesized in Synthesis Example 3 and 100 parts by mass of VdF-trifluoroethylene (TrFE) copolymer (VdF:TrFE=75:25% by mol) were dissolved in DMF at 25° C. so that the mass of the whole mixture of TrFE and the specific vinylidene fluoride homopolymer became 10% by mass based on the mass of the solvent.

Then, about 30 mg of the above solution was dropped onto a silicon substrate fixed to a spin coater, and a thin film was formed under the conditions of spin coating at 1,000 rpm for 1 second, and then at 2,000 rpm for 30 seconds. After completion of the spin coating, drying (about 14.6 kPa: 25° C.) was carried out in a desiccator under reduced pressure for one hour to distill off the remaining solvent.

The thin film formed on the silicon substrate was peeled off, and the content of I-form crystal structures was obtained by IR analysis according to KBr method. The content of I-form crystal structures was 100%.

Example 4

100 parts by mass of $CF_3(VdF)_{15}C_2H_5$ green powder (containing 57% by mass of I-form crystal structures) synthesized in Synthesis Example 3 and 100 parts by mass of polymethyl methacrylate were dissolved in DMF at 25° C. so as to become 10% by mass.

Then, about 30 mg of the above solution was dropped onto a silicon substrate fixed to a spin coater, and a thin film was formed under the conditions of spin coating at 1,000 rpm for 1 second, and then at 2,000 rpm for 30 seconds. After completion of the spin coating, drying (about 14.6 kPa: 25° C.) was carried out in a desiccator under reduced pressure for one hour to distill off the remaining solvent.

The thin film formed on the silicon substrate was peeled off, and the content of I-form crystal structures was obtained by IR analysis according to KBr method. The content of I-form crystal structures was 100%.

Example 5

$CF_3(VdF)_{15}C_2H_5$ green powder (containing 57% by mass of I-form crystal structures) synthesized in Synthesis Example 3 and VdF-trifluoroethylene (TrFE) copolymer (VdF:TrFE=75:25% by mol) in a ratio shown in Table 3 were dissolved in DMF at 25° C. so as to become 10% by mass.

Then, a silicon substrate on which aluminum was deposited on the surface was fixed to a spin coater, about 30 mg of the solution was dropped thereon, and a thin film was formed under the conditions of spin coating at 1,000 rpm for 1 second, then at 2,000 rpm for 30 seconds. After completion of the spin coating, drying (about 14.6 kPa: 25° C.) was carried out in a desiccator under reduced pressure for one hour to distill off the remaining solvent.

Then, aluminum was deposited on a substrate coated with the polymer mixture as an upper electrode, and ferroelectricity was measured by using ferroelectricity measuring equipment (measurement frequency: 1 KHz, applied voltage: 200 MV/m). Results are shown in Table 3.

TABLE 3

| Mixing ratio of $CF_3(VdF)_{15}C_2H_5$ green powder (% by mass) | Residual polarization: 2Pr (μC/cm²) |
|---|---|
| 0 | 13.5 |
| 5 | 14.0 |
| 10 | 16.8 |
| 20 | 21.3 |

As a result, when a mixing ratio of the $CF_3(VdF)_{15}C_2H_5$ green powder is higher, residual polarization was improved, and ferroelectricity was improved.

INDUSTRIAL APPLICABILITY

According to the present invention, a vinylidene fluoride homopolymer having I-form crystal structures at high purity can be prepared by extremely easy means such as dissolution and evaporation, and a thin film can also be easily formed.

The invention claimed is:

1. A method of forming a thin film comprising a mixture of a vinylidene fluoride homopolymer containing not less than 70% by mass of I-form crystal structure having a number average degree of polymerization of 3 to 20 and other polymer, wherein the other polymer is soluble in a solvent comprising an organic solvent having a dipole moment of not less than 2.8 alone, or in a solvent comprising the organic solvent as a part thereof;

said method comprises preparing a solution of a mixture of a vinylidene fluoride homopolymer having a number average degree of polymerization of 3 to 20 and the other polymer in a solvent comprising an organic solvent having a dipole moment of not less than 2.8 alone or comprising the organic solvent as a part thereof, applying the solution of the mixture of the vinylidene fluoride homopolymer and the other polymer to a substrate, and evaporating said solvent.

2. The method of forming a thin film of claim 1, wherein said vinylidene fluoride homopolymer has, at one end or both ends thereof, a moiety represented by the formula (1):

$$—(R^1)_n—Y \qquad (1)$$

wherein $R^1$ is a bivalent organic group, and does not contain a structural unit of the vinylidene fluoride homopolymer; n is 0 or 1; Y is a hydrogen atom, a halogen atom, or an alkyl group which may contain a halogen atom, however when n is 0, Y is not an iodine atom, and a number average degree of polymerization of the vinylidene fluoride homopolymer unit is 3 to 20.

3. The method of forming a thin film of claim 1, wherein said moiety represented by the formula (1) is a linear or branched alkyl group which has 1 to 10 carbon atoms and may contain a halogen atom.

4. The method of forming a thin film of claim 1, wherein said solvent comprises 5 to 100% by mass of an organic solvent having a dipole moment of not less than 2.8.

5. The method of forming a thin film of claim 1, wherein said other polymer is a ferroelectric and/or non-ferroelectric polymer soluble in said organic solvent.

6. The method of forming a thin film of claim 1, wherein said other polymer is a vinylidene fluoride-trifluoroethylene copolymer or polymethacrylate.

7. A thin film comprising a mixture of a vinylidene fluoride homopolymer containing not less than 70% by mass of I-form crystal structure having a number average degree of polymerization of 3 to 20 and other polymer, wherein the other polymer is soluble in a solvent comprising an organic solvent having a dipole moment of not less than 2.8 alone, or in a solvent comprising the organic solvent as a part thereof.

8. The thin film of claim 7, wherein said other polymer is a ferroelectric and/or non-ferroelectric polymer other than the vinylidene fluoride homopolymer.

9. The thin film of claim 7, wherein said other polymer is vinylidene fluoride-trifluoroethylene copolymer or polymethacrylate.

10. The thin film of claim 7, wherein said vinylidene fluoride homopolymer containing not less than 70% by mass of I-form crystal structure is contained in the mixture of vinylidene fluoride homopolymer and the other polymer in an amount of not less than 5% by mass to not more than 95% by mass.

11. The thin film of claim 7, wherein the polymer constituting the other polymer is a ferroelectric polymer selected from the group consisting of fluorine-containing polymers different from the vinylidene fluoride homopolymer, cyano polymers, odd nylon polymers and aromatic polyamide, and wherein the non-ferroelectric polymer constituting the other polymer is selected from the group consisting of polymers obtained by polymerizing at least one monomer selected from olefin, fluorine-containing olefin, acrylic compounds, methacrylic compounds, fluorine-containing acrylic compounds, fluorine-containing methacrylic compounds, norbornene compounds, organosilane compounds, fluorine-containing norbornene compounds, styrene compounds, fluorine-containing styrene compounds, vinyl ether and fluorine-containing vinyl ether, which polymers do not exhibit ferroelectricity.

* * * * *